United States Patent [19]

Davies et al.

[11] Patent Number: 5,040,871

[45] Date of Patent: Aug. 20, 1991

[54] IMAGING SYSTEM

[75] Inventors: Neil Davies, Snaith; Malcolm McCormick, Sheffield, both of England

[73] Assignee: The University of Sheffield, Sheffield, England

[21] Appl. No.: 930,648

[22] Filed: Nov. 13, 1986

[30] Foreign Application Priority Data

Nov. 16, 1985 [GB] United Kingdom ............... 8528286

[51] Int. Cl.$^5$ ..................... G02B 27/22; G03B 21/60
[52] U.S. Cl. .................................... 359/458; 359/455; 359/462
[58] Field of Search ............... 350/130, 131, 144, 117, 350/128

[56] References Cited

U.S. PATENT DOCUMENTS

| 4,078,854 | 3/1978 | Yano | 350/130 X |
| 4,526,439 | 7/1985 | Okoshi et al. | 350/167 X |
| 4,552,442 | 11/1985 | Street | 354/112 |

FOREIGN PATENT DOCUMENTS 84998 6/1983 European Pat. Off. .

Primary Examiner—Scott J. Sugarman
Attorney, Agent, or Firm—Trexler, Bushnell, Giangiorgi & Blackstone, Ltd.

[57] ABSTRACT

The invention relates to the production of three dimensional images for direct viewing or for recording on a sensitized recording surface. The invention provides a method and apparatus for the direct production of integral parallax orthoscopic panoramagramic images, which objective is met by a process comprising directing at an object a means of gathering and focussing incoming radiation from the object of a wavelength to which said means is suited, positioning to either side of said gathering and focussing means a grouping means for producing a number of groups of individual waves, each group emanating from a part of said object, said grouping means generating an image in pseudoscopic form, and a means of encoding the pseudoscopic image as discrete parallactic information on a single plane, for subsequent viewing as an orthoscopic image.

11 Claims, 3 Drawing Sheets

IMAGING SYSTEM

BACKGROUND OF THE INVENTION

I. Field of the Invention

This invention relates to imaging systems, and is particularly concerned with systems for producing integral or parallax panoramagramic images for direct viewing, projection onto a screen, or for recording on a sensitized recording surface.

II. Description of the Prior Art

Early attempts at producing a three-dimensional image had the disadvantage that the image necessarily had to be viewed through a stereoscope or through special spectacles. Subsequent research concentrated on systems where the image was viewed through a parallax barrier, but the actual production of the image continued to embody certain disadvantages.

Thus there was proposed a method of binocular stereopsis producing what is referred to as a parallax stereogram, but here the information contained in the image is simply twice that of a monocular system and as a result there is little freedom in the viewing position. To overcome this limitation it is necessary to increase the parallax information contained in the image. Instead of the two points of view used in the parallax stereogram, a multiplicity of views are used, and in some systems an infinite series representing all points of view between certain angular limits is used. This compound image is known as a parallax panoramagram. In the parallax panoramagram, the width to pitch ratio of the slit plate is much smaller than in the parallax stereogram, thus a wider viewing angle and more continuous spatial image can be achieved.

In its application to photography, recording a parallax panoramagram involves either a camera which moves along a horizontal track with the camera body distorting in such a way that a line drawn between the centre of the plate and the centre of the taking lens always passes through the centre of interest of the subject, or a multi-lensed camera with any appropriate number of lenses each simultaneously taking a photograph from a slightly different position. The disadvantage of the first method is that moving objects cannot be photographed and the camera mechanism is complex, while the second requires very accurately registered printing to produce the final 3-D image which is not a continuous panorama but a finite number of views which equal the number of original lenses. This inevitably produces an effect known as 'flipping' to occur when viewing angle is changed, that is the observed spot is switched from the image produced by one lens to that produced by an adjacent lens.

To overcome these problems, a method has been proposed using a fixed, large aperture lens. If the lens has a wide aperture the single lens may collect the necessary picture information of the object viewed from various and continuous directions and the image may be directly recorded onto the photographic plate placed behind a slit plate. This method works well, however, the image recorded is in fact pseudoscopic, that is, a spatial image is produced which is entirely inverted in depth like a hologram viewed from the wrong side. Also the parallax barrier which was proposed to be used has a number of drawbacks both in recording and viewing a spatial image. In recording, it is the problem of the diffraction of light passing through a fine slit which causes a loss of image definition and available light, while in viewing it is the marked darkening of the image plus the annoyance of the grid's presence.

Some of these problems were overcome with the development of plastic technology which allowed a choice of clear materials which could be formed into lensed sheets. The lensed sheet collects the parallax information far more efficiently than the parallax barrier, and is much less obtrusive when viewing the image. Consequently the grid plate was replaced by the more efficient lensed sheet. However, the problem is that the systems available involve a two stage process one to record a pseudoscopic image and the other to project an orthoscopic image, and suffer due to image deterioration and the coarseness of the grid which limits the stereoscopic depth factor.

The object of the present invention, is to provide a method of and equipment for the direct production of integral or parallax orthoscopic panoramagramic images of improved quality and wider practical application than hitherto.

SUMMARY OF THE INVENTION

According to the present invention, a method of producing a parallax panoramagramic image in a single stage comprises directing at an object a means of gathering and focussing incoming radiation from the object of a wavelength to which said means is suited, positioning to either side of said gathering and focussing means a grouping means for producing a number of groups of individual waves, each group emanating from a part of said object, said grouping means generating an image in pseudoscopic form, and a means of encoding the pseudoscopic image as discrete parallactic information on a single plane, for subsequent viewing as an orthoscopic image.

In the application of the invention to radiation over the range of visible wavelengths and other wavelengths suitable for refractive or reflective focussing, the gathering and focussing means is preferably a single large aperture lens, and the means of providing groupings of visible radiation from different parts of the object may be an autocollimating transmission screen or a retroreflective or retroimaging unit. The means of encoding the pseudoscopic image as discrete parallactic information on a single plane may be an apertured lenticular screen but a lensed screen capable of producing integral images may equally well be used. The result is a one stage three dimensional orthoscopic optical system with an ability to produce an image that has high resolution with considerable information with parallax in the vertical, horizontal or any combined direction, resulting from the single large aperture lens "observing" the object from a multiplicity of view points by virtue of the interposed, e.g., autocollimating transmission screen or retroreflective or retroimaging unit. The invention is therefore ideally suited to the production of 3-D photographs, by building the autocollimating transmission screen or retroreflective or retroimaging unit and the lenticular or lensed screen into a camera, to project the encoded pseudoscopic image directly onto sensitised film. When viewed through means to decode the discrete parallactic information, the resultant photographs display good orthoscopic depth, and where flipping or a cardboard cut-out effect common with all static recording means known hitherto can be substantially eliminated or present to a controlled degree. This optical system could equally well be adapted for use in moving film, television and video cameras provided with encoding means as discussed earlier and when an appropriate receiver viewing screen or the like would be provided with a decoding means through which an orthoscopic spacial image is viewed. With instant film cameras, again the camera would be provided with the encoding means as discussed earlier and the films would be provided with an overlay decoding means to enable the print to be viewed in decoded orthoscopic spacial form.

Of possible importance when considering the application of the invention to television and bearing in mind that a transitional period would be needed to allow all television sets to be converted to receive images in accordance with the invention, it is the case that images produced in accordance with the invention can be viewed quite adequately in two dimensional form.

As an optical system, the invention has considerable applicability as an observation means, with the major advantage that the depth and resolution of the image, in this case projected onto a viewing screen that may be a lenticular or integral screen and the available information with vertical, horizontal or combined parallax allows accurate measurement of the distance between two distant objects being viewed.

In addition to the application of the invention to radiation over the range of visible wavelengths and other wavelengths suitable for lens focussing, the invention is equally applicable to other wavelengths such as in the sonar range and where an appropriate accoustic lens may be utilised in conjunction with, for example, a retroreflective mirror for producing group of wavelengths and the production of a pseudoscopic image. When applied to microwaves, they may be focussed by appropriate magnetic fields or waveguides and when again, e.g., a retroflective mirror can be employed for grouping for producing groups of wavelengths and the production of a pseudoscopic image. With both of these applications any appropriate source of sonar or microwaves can be employed.

In the application of the invention in the X-ray field a multiple source of X-rays would be required as either a linear or a two dimensional array, with the provision of a lead barrier with slots or pin holes disposed beyond the object at which the X-rays are directed and in front of a means of grouping the rays and producing an image of orthoscopic form of similar character to that employed for wavelengths employed in the visible field.

Several embodiments of the invention will now be described with reference to the accompanying drawings, each of which is a schematic representation of one embodiment of the invention.

DESCRIPTION OF THE ILLUSTRATED EMBODIMENTS

Figure 1:
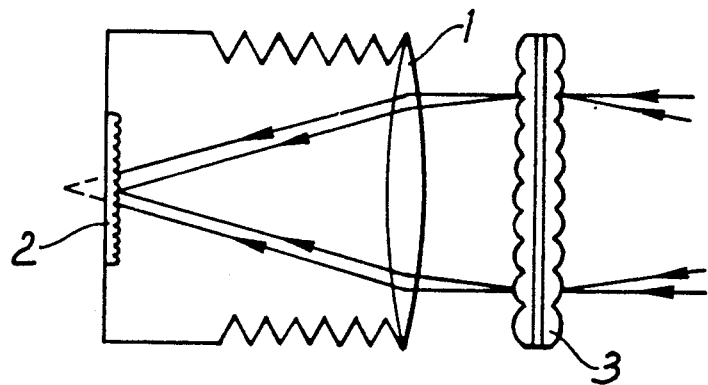
FIG. 1 is a schematic representation of a first embodiment in accordance with the invention.

In FIG. 1, a wide aperture objective lens 1 is mounted for movement towards or away from a lenticular or integral screen 2. Beyond the lens 1, an autocollimating transmission screen 3 is provided. Thus, the screen 3 groups incoming radiation of visible wavelengths, and the lens focusses the groups of wavelengths on the lenticular or integral screen. This embodiment can be used for direct viewing of a three-dimensional image of the object, or a sensitised film can be applied behind screen 2 on to which the image can be recorded. By applying a lenticular or integral screen to the surface of the resultant photograph a permanent integral parallax orthoscopic panoramagramic image of improved quality substanially free from flipping or the cardboarding effect is provided and by a one-stage process.

Figure 2:
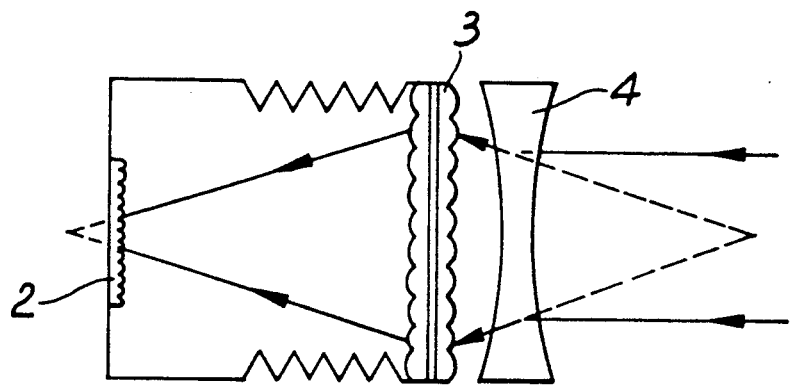
FIG. 2 is a schematic representation of a second embodiment in accordance with the invention.
Figure 3:
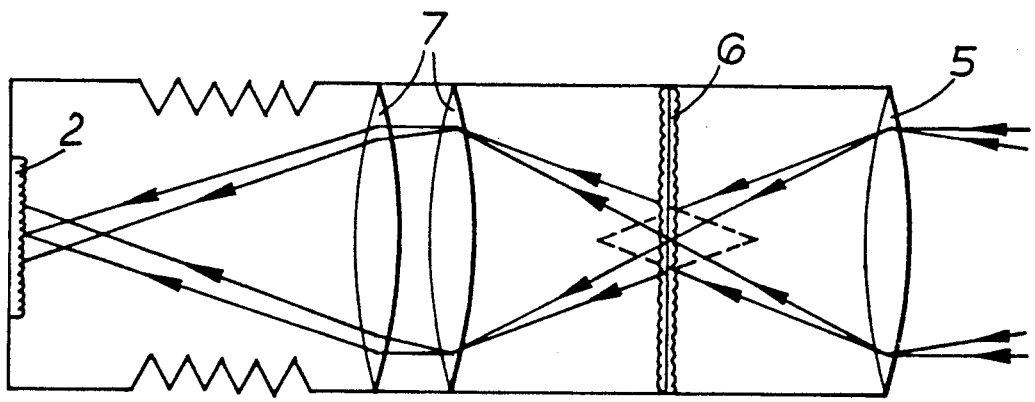
FIG. 3 is a schematic representation of a third embodiment in accordance with the invention.

FIG. 2 corresponds directly to FIG. 1, but shows the use of a wide aperture negative lens 4 placed in front of the autocollimating transmission screen 3. FIG. 3 shows a further embodiment corresponding to FIG. 1, but one employing multiple lenses. Thus, here, a wide aperture lens 5 is positioned in front of a transmission type double integral fine pitch screen 6, groups of wavelengths being directed to twin objective lenses 7 for focussing the groups on the lenticular or integral screen 2.

Figure 4:
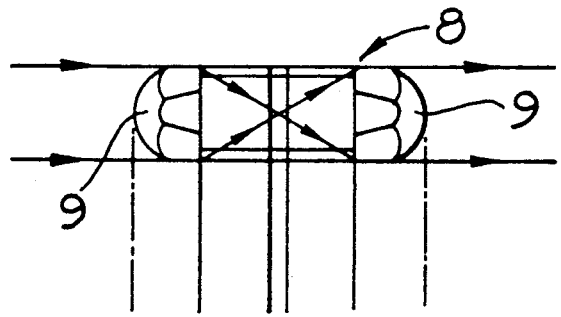
FIG. 4 is a schematic representation of the structure of an autocollimating screen in accordance with the invention.

Of independent significance, and capable of producing still further improvement of the image formed, is the construction of autocollimating screen 8 shown in FIG. 4. Here, the screen 8 is formed as a ground glass focussing screen or double integral fine pitch transmission screen on both sides of which are provided a matrix of individual hexagonal based lenses 9. In certain circumstances, a still further improvement can be provided by providing each lens with a lens chamber such that the lens is distanced from the ground glass focussing screen.

Figure 5:
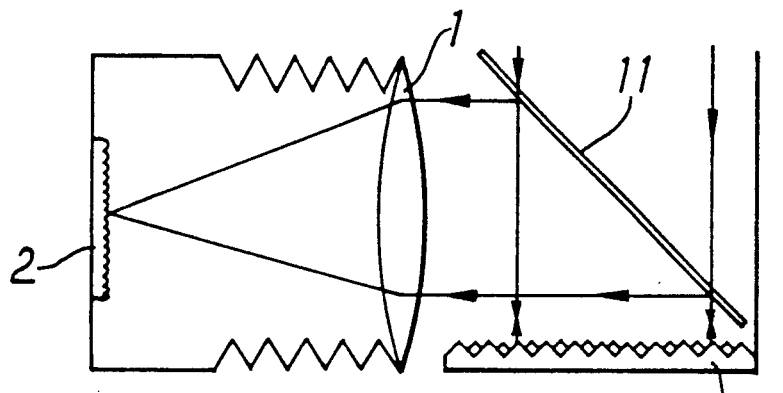
FIG. 5 is a schematic representation of a fourth embodiment in accordance with the invention.
Figure 6:
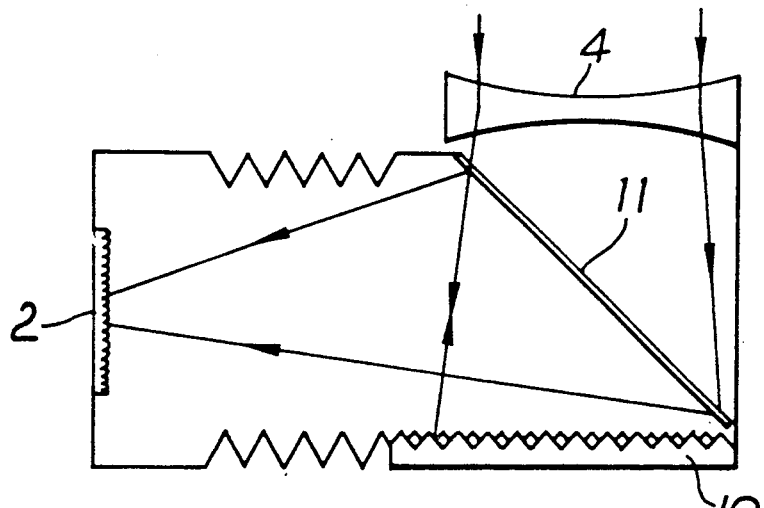
FIG. 6 is a schematic representation of a fifth embodiment in accordance with the invention.
Figure 7:
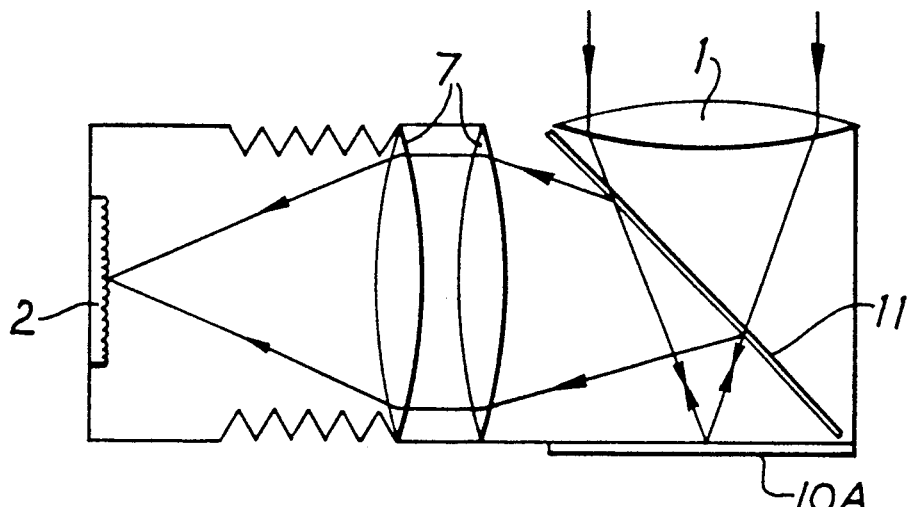
FIG. 7 is a schematic representation of a sixth embodiment in accordance with the invention.

FIG. 5 shows an alternative construction employing a retroreflective screen 10. Here, incoming wavelengths pass through a beam splitter 11 to the screen 10, which is of the corner cube type, groups of wavelengths being reflected to the beam splitter 11 for direction to a wide aperture lens 1 and focussing on a lenticular or integral screen 2. A similar arrangement is shown in FIG. 6, where a wide aperture negative lens 4 is placed before the beam splitter 11, wavelengths reflecting from the corner cube reflector 10 to the beam splitter for direction directly at the lenticular or integral screen 2. FIG. 7 shows a multiple lens system where a wide aperture lens 1 focusses incoming wavelengths through the beam splitter 11 and on to, in this embodiment, a fine pitch triple mirror, fine pitch corner cube or beaded screen reflector 10A, to reflect groups of wavelengths back to the beam splitter 11 for direction to the objective lenses 7, to focus the groups of wavelengths on to the lenticular or integral screen.

Figure 8:
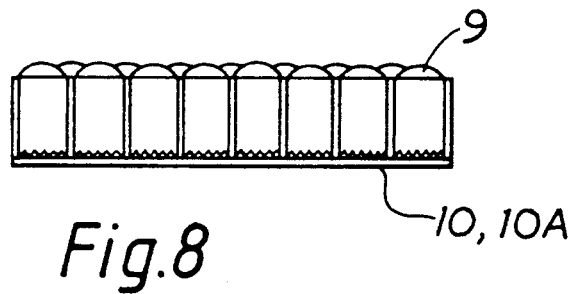
FIG. 8 is a schematic representation of a retroreflective screen in accordance with the invention.

Of independent significance is the retroreflective screen illustrated in FIG. 8, where a fine pitch beaded screen or a corner cube screen is overlaid with a matrix of hexagonal based lenses 9. The lenses 9 are spaced from the screen, but a still further improvement can be achieved if the lenses each have a lens chamber, to maintain the integrity of the image produced by any one lens and hence prevent any cross-talk or overspill of the images of adjacent lenses.

It will be understood that each of the embodiments of FIGS. 1 to 9 can be employed in direct optical viewing systems or in cameras of the still or moving film type, or television cameras.

Figure 9:
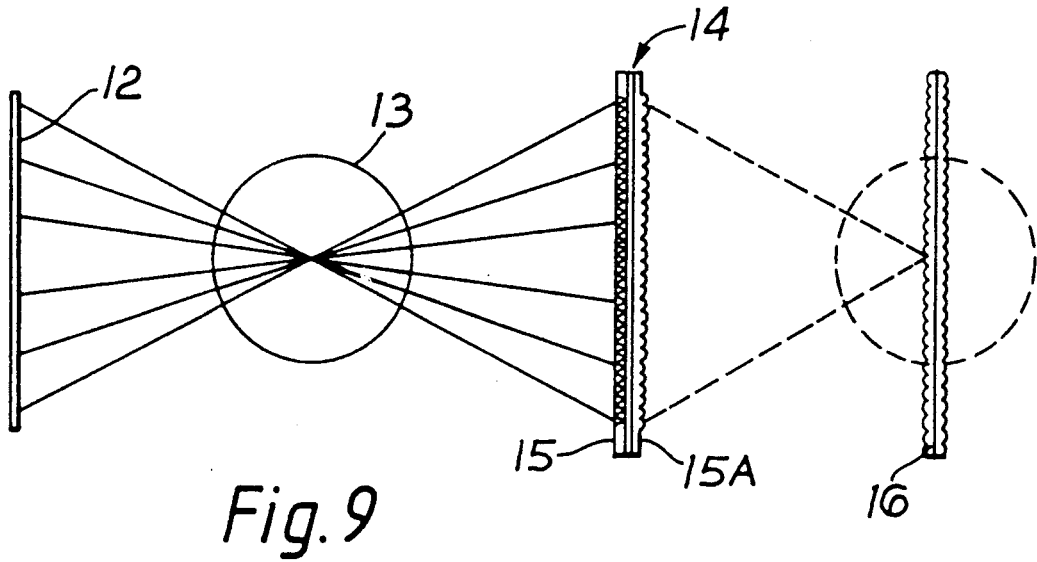
FIG. 9 is a schematic representation of a seventh embodiment in accordance with the invention.

FIG. 9 shows the invention applied to X-rays. Unlike visible wavelengths, X-rays for practical purposes are specifically created. Thus, in direct replacement of a wide aperture lens, a means 12 of producing a two-dimensional array of X-ray point sources is provided for direction through an object 13 and to a phosphorescent screen 14 on one side of which is a perforated lead sheet 15 and on the other an integral lens array 15A for producing groups of X-rays for direction on to a double integral screen 16 for direct viewing of the three-dimensional X-ray image of the object. Alternatively, the double integral screen can be replaced by a permanent recording medium.

We claim:

1. A method of producing a parallax panoramagramic image in a single stage comprising directing at an object a means for gathering and focusing incoming radiation from the object of a wavelength to which said means is suited, positioning to either side of said gathering and focussing means, a grouping means for producing and transmitting a number of groups of individual waves, each group emanating from a part of said object, said grouping means generating an image in pseudoscopic form, and a means for encoding the transmitted pseudoscopic image as discrete parallactic information on a single plane, for subsequent viewing as an orthoscopic image.

2. A method as in claim 1, wherein the incoming radiation is of a wavelength in the visible range and the gathering and focussing means is a single large aperture lens.

3. A method as in claim 1 or claim 2, wherein said grouping means is an autocollimating transmission screen.

4. A method as in claim 1 or claim 2, wherein said grouping means is a transmission type double integral fine pitch screen.

5. A method as in claim 1, wherein the means of encoding the pseudoscopic image as discrete parallactic information on a single plane is an apertured lenticular screen.

6. A method as in claim 1, wherein the means of encoding the pseudoscopic image as discrete parallactic information on a single plane is a lensed screen capable of producing integral images.

7. An imaging system for producing a parallax panoramagramic image in a single stage comprising a means for gathering and focussing incoming radiation from an object, there being positioned to either side of said gathering and focussing means a grouping means for producing and transmitting a number of groups of individual waves, each group emanating from a part of said object and there being a means of encoding a pseudoscopic image generated by said grouping means as discrete parallactic information on a single plane for subsequent viewing as an orthoscopic image.

8. An imaging system as claimed in claim 7, wherein said apparatus is a camera comprising a wide aperture lens, an autocollimating transmission screen, and a lenticular or lensed screen, and whereby an encoded pseudoscopic image is projected as discrete parallactic information directly on to the focal plane of said camera.

9. An imaging system as in claim 7, when the incoming radiation is X-rays, comprising a perforated X-ray barrier, a phosphorescent screen to convert said X-rays to visible radiation, an integral lens array to group said radiation, and a means of encoding as discrete parallactic information a pseudoscopic image generated by said grouping means.

10. An imaging system as in claim 9, wherein said encoding means is a double lenticular or double integral screen for direct viewing of said pseudoscopic image.

11. An imaging system as in claim 9, wherein said encoding means is in contact with sensitised film for producing a permanent image.

* * * * *